(12) United States Patent
Turner et al.

(10) Patent No.: US 7,208,906 B2
(45) Date of Patent: Apr. 24, 2007

(54) EXCITATION OF SWITCHED RELUCTANCE MOTORS

(75) Inventors: Michael James Turner, Leeds (GB); Paul Andrew Sykes, Leeds (GB)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 10/837,140

(22) Filed: Apr. 30, 2004

(65) Prior Publication Data

US 2004/0222765 A1 Nov. 11, 2004

(30) Foreign Application Priority Data

May 7, 2003 (GB) ................... 0310491.6

(51) Int. Cl.
*H02P 1/46* (2006.01)
(52) U.S. Cl. .................. 318/701; 318/254; 318/702
(58) Field of Classification Search ........ 318/701–702, 318/254, 562, 34, 59, 62, 445, 447, 452, 318/484, 706, 721, 138, 700
See application file for complete search history.

(56) References Cited

U.S. PATENT DOCUMENTS

| | | | |
|---|---|---|---|
| 3,639,818 A | 2/1972 | Wiart | |
| 4,500,824 A | 2/1985 | Miller | |
| 5,051,680 A | 9/1991 | Belanger | |
| 5,138,244 A | 8/1992 | Bahn | |
| 5,264,775 A * | 11/1993 | Namuduri et al. .......... | 318/811 |
| 5,485,047 A * | 1/1996 | Bahn .......................... | 310/166 |
| 5,539,293 A | 7/1996 | Randall et al. | |
| 5,621,294 A | 4/1997 | Bessette et al. | |
| 5,637,972 A | 6/1997 | Randall et al. | |
| 5,650,779 A * | 7/1997 | Sugden ......................... | 341/9 |
| 5,701,064 A * | 12/1997 | Horst et al. ................. | 318/701 |
| 5,739,650 A * | 4/1998 | Kimura et al. .............. | 318/254 |
| 5,739,662 A * | 4/1998 | Li ............................... | 318/701 |

(Continued)

FOREIGN PATENT DOCUMENTS

DE 10006191 A1 9/2000

(Continued)

OTHER PUBLICATIONS

Stephenson, et al., "The Characteristics, Design and Applications of Switched Reluctance Motors and Drives," PCIM '93, Nürnberg, Germany, Conference & Exhibition, Jun. 21-24, 1993, pp. 1-68.

*Primary Examiner*—Paul Ip
(74) *Attorney, Agent, or Firm*—Haynes and Boone, LLP

(57) ABSTRACT

A switched reluctance drive is supplied from a power source. The phases of the machine are controlled by a current controller which uses an excitation strategy to minimize the supply current drawn for a particular output. The strategy alternates the excitation between two phases for a given time until the rotor moves to a desired position. A method of starting a switched reluctance motor having a stator with at least two phases, a moveable part, and a position transducer includes determining from transducer output a plurality of phases that are available to produce force in a desired direction, energizing a first phase of the available phases for a predetermined time period that is independent of the transducer output, and energizing a second phase of the available phases after energization of the first phase is initiated.

22 Claims, 8 Drawing Sheets

U.S. PATENT DOCUMENTS

| | | |
|---|---|---|
| 5,747,962 A | 5/1998 | Fulton |
| 5,789,893 A * | 8/1998 | Watkins .................. 318/701 |
| 5,894,211 A | 4/1999 | Sugden |
| 6,008,599 A | 12/1999 | Beck |
| 6,011,377 A * | 1/2000 | Heglund et al. ........... 318/701 |
| 6,014,002 A | 1/2000 | Guinet |
| 6,049,181 A | 4/2000 | Kolomeitsev |
| 6,054,819 A | 4/2000 | Pengov |
| 6,107,764 A * | 8/2000 | Blackburn ................ 318/254 |
| 6,137,248 A * | 10/2000 | Kalpathi .................. 318/254 |
| 6,225,767 B1 | 5/2001 | Lovett et al. |
| 6,232,741 B1 * | 5/2001 | Saitou et al. ............. 318/701 |
| 6,288,514 B1 * | 9/2001 | Direnzo et al. ........... 318/701 |
| 6,291,949 B1 * | 9/2001 | Green .................... 318/254 |
| 6,411,060 B1 | 6/2002 | Jung |
| 6,448,736 B1 * | 9/2002 | Lajsner et al. ............ 318/701 |
| 6,608,462 B2 * | 8/2003 | Slater et al. ............. 318/701 |
| 2001/0010452 A1 * | 8/2001 | Moriarty .................. 318/700 |
| 2001/0026139 A1 * | 10/2001 | Mayes ..................... 318/701 |
| 2002/0185990 A1 * | 12/2002 | Elliott et al. ............. 318/701 |
| 2002/0190684 A1 * | 12/2002 | Tankard ................... 318/701 |
| 2003/0030343 A1 * | 2/2003 | Naito et al. ............. 310/156.6 |
| 2003/0042864 A1 | 3/2003 | Lequesne et al. |

FOREIGN PATENT DOCUMENTS

| | | |
|---|---|---|
| EP | 0734117 B1 | 9/1996 |
| EP | 1 265 349 A1 | 12/2002 |
| EP | 1265349 | 12/2002 |

* cited by examiner

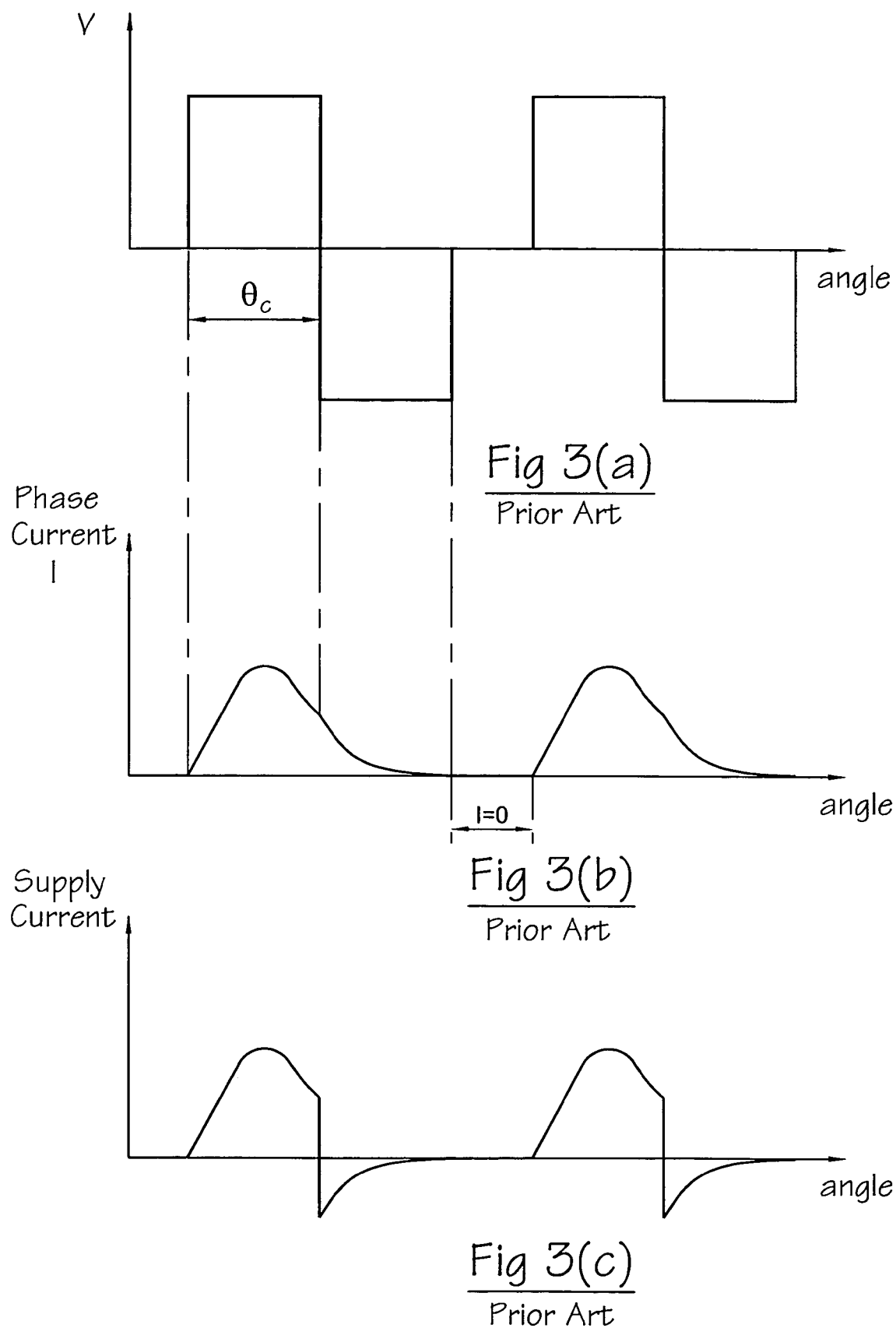

EXCITATION OF SWITCHED RELUCTANCE MOTORS

CROSS-REFERENCE TO RELATED APPLICATION

The subject matter of this application is related to the subject matter of British Patent Application No. GB 0310491.6, filed May 7, 2003, priority to which is claimed under 35 U.S.C. § 119 and which is incorporated herein by reference.

BACKGROUND OF THE INVENTION

1. Field of the Invention

Embodiments of this invention relate to the excitation of switched reluctance motors. In particular, they relate to excitation to reduce the supply current drawn for a particular output.

2. Description of Related Art

The characteristics and operation of switched reluctance systems are well known in the art and are described in, for example, "The characteristics, design and application of switched reluctance motors and drives" by Stephenson and Blake, PCIM'93, Nürnberg, 21–24 Jun. 1993, incorporated herein by reference. FIG. 1 shows a typical switched reluctance drive in schematic form, where the switched reluctance motor 12 drives a load 19. The input DC power supply 11 can be rectified AC mains, a battery or some other DC source. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive, and a rotor position detector 15 is typically employed to supply signals corresponding to the angular position of the rotor. The rotor position detector 15 may take many forms and its output may also be used to generate a speed feedback signal.

Many different power converter topologies are known, several of which are discussed in the Stephenson paper cited above. One of the most common configurations is shown for a single phase of a polyphase system in FIG. 2, in which the phase winding 16 of the machine is connected in series with two switching devices 21 and 22 across the busbars 26 and 27. Busbars 26 and 27 are collectively described as the "DC link" of the converter. Energy recovery diodes 23 and 24 are connected to the winding to allow the winding current to flow back to the DC link when the switches 21 and 22 are opened. A capacitor 25, known as the "DC link capacitor", is connected across the DC link to source or sink any alternating component of the DC link current (i.e. the so-called "ripple current") which cannot be drawn from or returned to the supply. In practical terms, the capacitor 25 may comprise several capacitors connected in series and/or parallel and, where parallel connection is used, some of the elements may be distributed throughout the converter.

For any system, there is the requirement to know the position of the rotor relative to the stator. While a high-resolution resolver could be used, these are relatively expensive and unnecessarily complex for the majority of applications. Instead, a relatively simple rotor position transducer (RPT) is usually used, comprising a castellated member fixed to the rotor and a set of detectors fixed relative to the stator. Common systems use disc or cup-shaped vanes on the rotor with the same number of teeth as there are rotor poles, together with optical or magnetic detectors on the stator, typically with one detector for each phase of the drive. Such a system is illustrated in FIG. 5 for a 3-phase system with four rotor poles.

The switched reluctance drive is essentially a variable speed system and is characterized by voltages and currents in the phase windings of the machine which are quite different from those found in traditional, sinusoidally fed, types of machines. As is well known, there are two basic modes of operation of switched reluctance systems: the chopping mode and the single-pulse mode, both of which are described in the Stephenson paper cited above. FIGS. 3(a)–3(c) illustrate typical waveforms in single-pulse control. FIG. 3(a) shows the voltage waveform applied by the controller to the phase winding. At a predetermined rotor angle, the voltage is applied by switching on the switches in the power converter 13 and applying constant voltage for a given angle $\theta_c$, the conduction angle. The current rises from zero, reaches a peak and falls slightly as shown in FIG. 3(b). When $\theta_c$ has been traversed, the switches are opened and the action of energy return diodes places a negative voltage across the winding, causing the flux in the machine, and hence the current, to decay to zero. There is then typically a period of zero current until the cycle is repeated. It will be clear that the phase is drawing energy from the supply during $\theta_c$ and returning a smaller amount to the supply thereafter. FIG. 3(c) shows the current which has to be supplied to the phase winding by the power converter and the current which flows back to the converter during the period of energy return. Instead of opening both switches simultaneously, it is well known that there are advantages in opening one switch in advance of the other, allowing the current to circulate around the loop formed by the closed switch, the phase winding and a diode—this is known as "freewheeling" and is used for various reasons, including peak current limitation and acoustic noise reduction. The single-pulse mode is normally used for the medium and high speeds in the speed range of a typical drive.

At zero and low speeds, however, the single-pulse mode is not suitable, due to the high peak currents which would be experienced, and the chopping mode is used. There are two principal variants of the chopping mode. The simplest method is to simultaneously open the two switches associated with a phase winding, e.g. switches 21 and 22 in FIG. 2. This causes energy to be returned from the machine to the DC link, with a corresponding rapid fall in the phase current. This is sometimes known as "hard chopping". The alternative method is to open only one of the switches and allow freewheeling to occur: this is known as "freewheel chopping" or "soft chopping". In this mode of control, no energy is returned to the DC link from the phase winding.

With any chopping scheme, there is a choice of strategy for determining the current levels to be used. Many such strategies are known in the art. One commonly used scheme is to use a hysteresis controller which enables chopping between upper and lower currents. A typical scheme is shown in FIG. 4(a) for hard chopping. At a chosen switch-on angle $\theta_{on}$ (which is often the position at which the phase has minimum inductance, but may be some other position), the voltage is applied to the phase winding and the phase current is allowed to rise until it reaches the upper hysteresis current $I_u$. At this point both switches are opened and the current falls until it reaches the lower current $I_l$ and the switches are closed again, repeating the chopping cycle until a chosen switch-off angle $\theta_{off}$ is reached. FIG. 4(b) shows the corresponding phase current waveform for a hysteresis controller using freewheeling: the reduction in chopping frequency is immediately evident.

While switched reluctance motors are described here in relation to current control and, implicitly, its feedback to the controller, those of ordinary skill in the art will appreciate that the output of a switched reluctance motor can be subjected to flux control instead. Indeed, flux has a more direct relationship to output torque or force and can, therefore, be a more accurate characteristic on which to base motor control.

None of the above control strategies takes into account what happens when the contributions of two or more phases are considered. In this situation the bus currents associated with the individual phases are added to give the total DC link current.

Two or more phases conducting together can occur in many different systems. Although in 2-phase systems it is usual to only operate the phases alternately, U.S. Pat. No. 5,747,962, commonly assigned to the present assignee and incorporated herein by reference, discloses a method of operating both phases simultaneously over part of the electrical cycle of the machine. In 3-phase machines, it is possible to operate by exciting Phase A alone, then Phase B alone, then Phase C alone. This pattern of energization is known variously in the art as 33% conduction (because one phase conducts for only 33% of a cycle) and 1-phase conduction (because only one phase is conducting at any one time). However, to improve both the minimum torque and the average torque output of the machine, advantage is often taken of the fact that the torque productive portions of each phase cycle overlap. Thus, an excitation pattern of A, AB, B, BC, C, CA, A . . . is often used. This pattern is described variously in the art as 50% conduction (since each phase conducts for 50% of its cycle) or 1½ phase conduction (since on average over the cycle there are 1½ phases conducting). Similarly for 4-phase machines, there are normally always two phases producing torque in the required direction, so phases can be energized in pairs: AB, BC, CD, DA, AB . . . Corresponding rules apply for higher phase numbers, in which it is possible to use three or more phases for at least part of the electrical cycle.

For a given excitation level, operation in this manner considerably increases the burden on the supply. For example, for a 3-phase system the average current demand is up 50% and in a 4-phase system is up 100%. While in some applications the absolute size of the DC link current is secondary to torque output, in other applications there is extreme sensitivity to the DC link current, as the source may have limited capacity. Typically, such limitations are found in sites which have stand-alone generation, or in mobile situations such as automotive, marine or aerospace applications. These sites are unsuited to drives in which there is simultaneous conduction by two phases because of the increased current demand.

Another way to address this problem is disclosed in EPA 1265349, commonly assigned to the present assignee and incorporated herein by reference. This describes a method of freewheeling in an outgoing phase while energizing the incoming phase from the supply. This attempts to provide the torque profile of a 1½ phase excitation while supplying current only to one phase. This works well when the inertia is low, but when the inertia is high the rotor accelerates slowly. In the meantime, the current in the freewheeling phase decays as a function of time, not rotor position, so there is a significant risk that the current (and hence the torque) will decay to zero before the rotor has reached a position where the next phase to be energized can supply sufficient torque on its own. If this happens, the motor will stall and can only be re-started if the outgoing phase is primed to re-establish the freewheeling current.

U.S. Pat. No. 5,539,293, commonly assigned to the present assignee and incorporated herein by reference, discloses a control system for starting a switched reluctance motor in which phases are excited in sequence in open loop with no reference to rotor position at all. This prior art is directed to zero load starting.

SUMMARY OF THE INVENTION

There is a need for a starting system according to embodiments of the invention which can start a high inertia load with a maximum amount of torque for a minimum current consumption.

In one form, embodiments of the invention resolve ambiguity in the phases producing force (torque) in a required direction by energizing them according to a period, as opposed to a rotor position, on the basis that one of a pair of adjacent phases will be in a suitably force-producing relationship with the moving part (rotor) to effect initial movement.

According to one embodiment of the invention there is provided a method of starting a switched reluctance motor having a stator with at least two phases, a moveable part, and a position transducer for providing information on the relative position of the moving part with respect to the phases, the transducer having an output with a resolution which is no finer than half the step angle of the motor, the method comprising: determining from the transducer output a plurality of phases that is available to produce force in a desired direction; energizing a first phase of the available phases for a predetermined period; and energizing a second phase of the available phases after energization of the first phase is initiated.

An embodiment of the invention also extends to a controller for starting a switched reluctance motor comprising a stator with at least two phases, a moving part, and a position transducer providing information on the relative position of the moveable part with respect to the phases, the transducer having an output with a resolution which is no finer than half the step angle of the motor, the controller comprising: means for determining from the transducer output a plurality of phases that is available to produce a force in a desired direction; means for energizing a first of the available phases for a predetermined period; and means for energizing a second of the available phases after energization of the first phase is initiated.

Embodiments of the invention use fixed time energization of one phase before the other in order to find and operate on that phase which is most torque productive.

The second phase is energized after the first, according to embodiments of the invention. After the torque created by the energization of the two phases has initiated movement in the motor, the subsequent energization can be carried out according to moveable part (e.g. rotor) position information.

The first phase may be energized for part of the time for which the second phase is energized. If it is not energized, it may be freewheeled so that current recirculates around the phase in a zero voltage loop.

In a particular form of the invention, the choice of phases to energize when starting depends upon rotor position information to determine the phases between which the ambiguity lies. In some circumstances the rest position of the moveable part may coincide with no ambiguity for subsequent starting, i.e. only one phase is available. In this case, embodiments of the invention can be arranged to determine whether the starting technique need be used at all, or whether another starting method can be used.

The excitation of a phase is controlled by current or flux control, according to embodiments of the invention. It is desirable to use some form of position feedback of the moving part relative to the stator. This may be transduced from monitoring a characteristic of the machine, such as phase current, or it can be derived by use of a position transducer device. Thus, the position information can be transduced directly from the position of the moveable part or indirectly from (e.g.) current when the moveable part comes to rest.

BRIEF DESCRIPTION OF THE DRAWINGS

The invention can be put into practice in various ways, some of which will now be described by way of example with reference to the accompanying drawings, in which:

FIGS. 3(a), (b) and (c) show the waveforms of voltage, phase current and supply current respectively for the known single-pulse mode of operation;

DETAILED DESCRIPTION OF PREFERRED EMBODIMENTS

Figure 1:
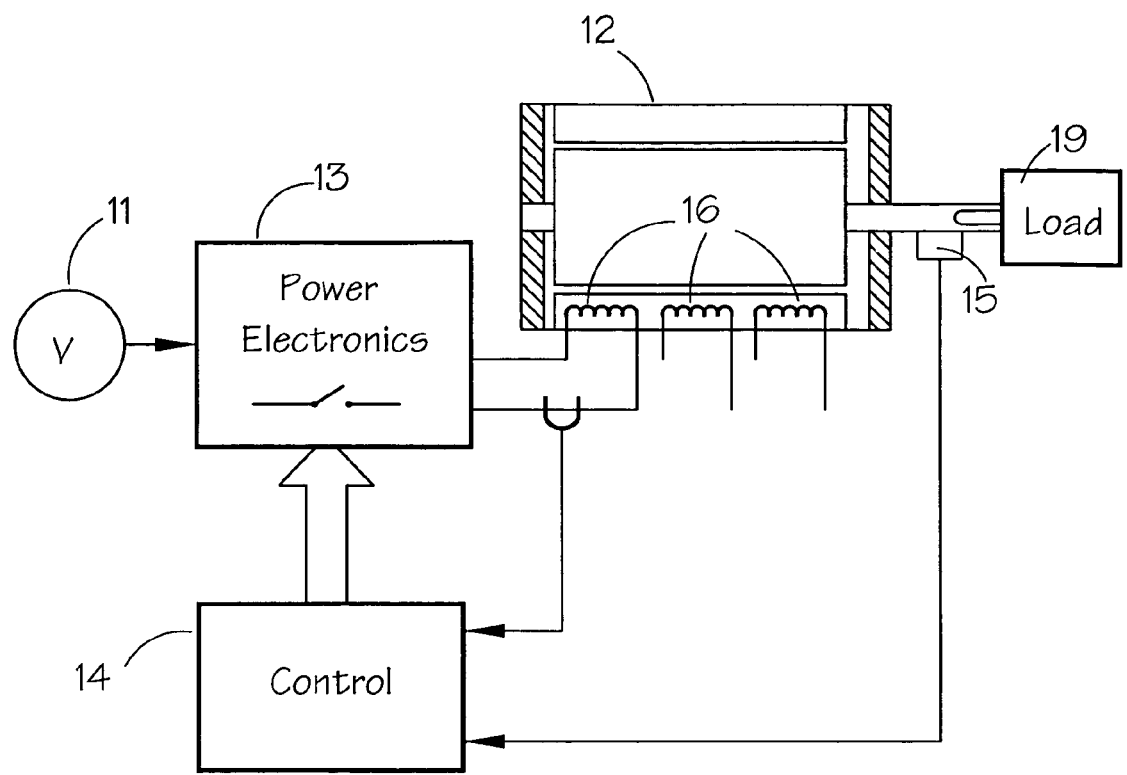
FIG. 1 shows a schematic diagram of a known switched reluctance system.
Figure 2:
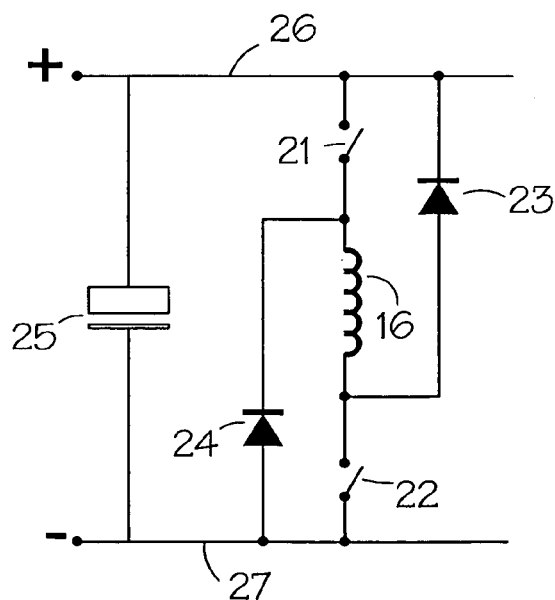
FIG. 2 shows the connection of one phase winding to the power converter of the drive of FIG. 1.
Figure 4A:
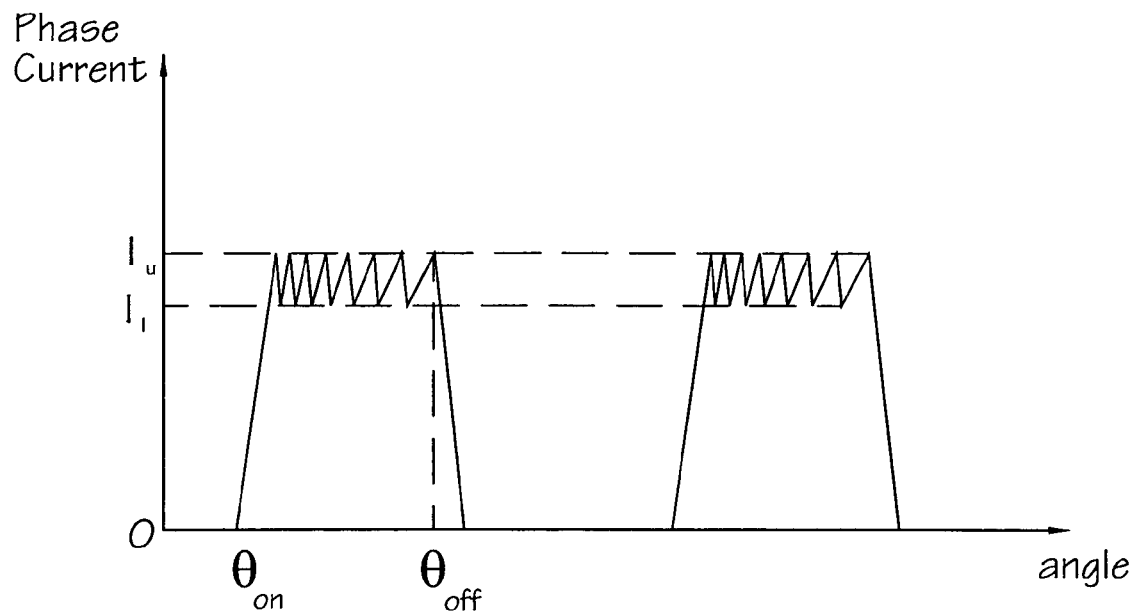
FIG. 4(a) shows a phase current waveform for the known hard chopping mode of operation.
Figure 4B:
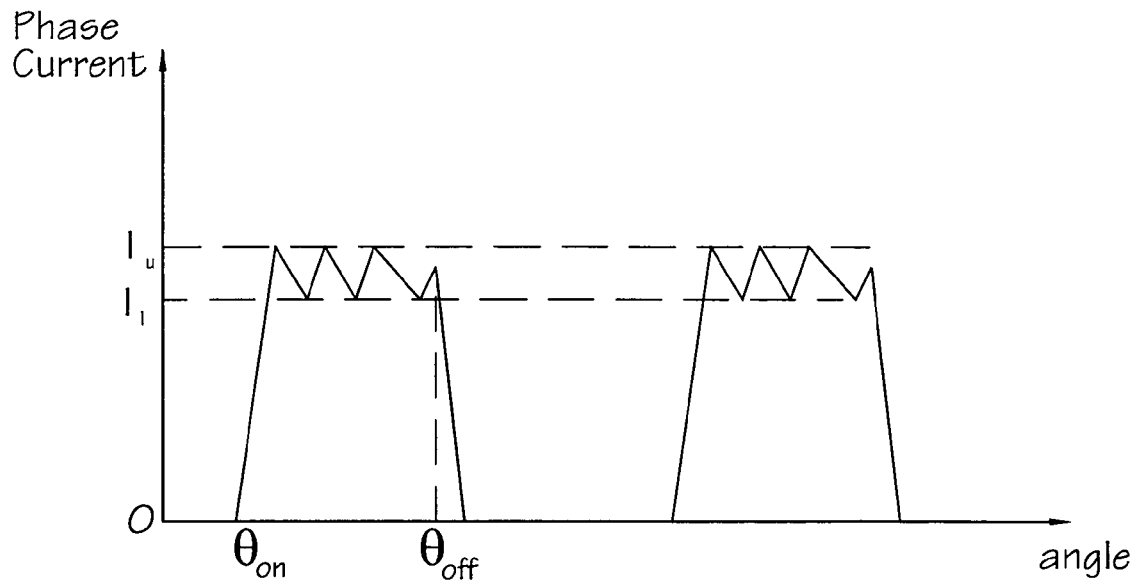
FIG. 4(b) shows a phase current waveform for the known freewheel chopping mode of operation.

Embodiments of the invention are implemented in this embodiment in a drive system such as that shown in FIG. 1. Switching circuits for each of the phases as shown in FIG. 2 optionally are used, but it is not necessary for the switching circuit to have freewheeling capability. According to embodiments of the invention to be described, the control strategy is adapted to exploit the capabilities of the chosen switching circuit by programming of the controller 14.

Figure 5:
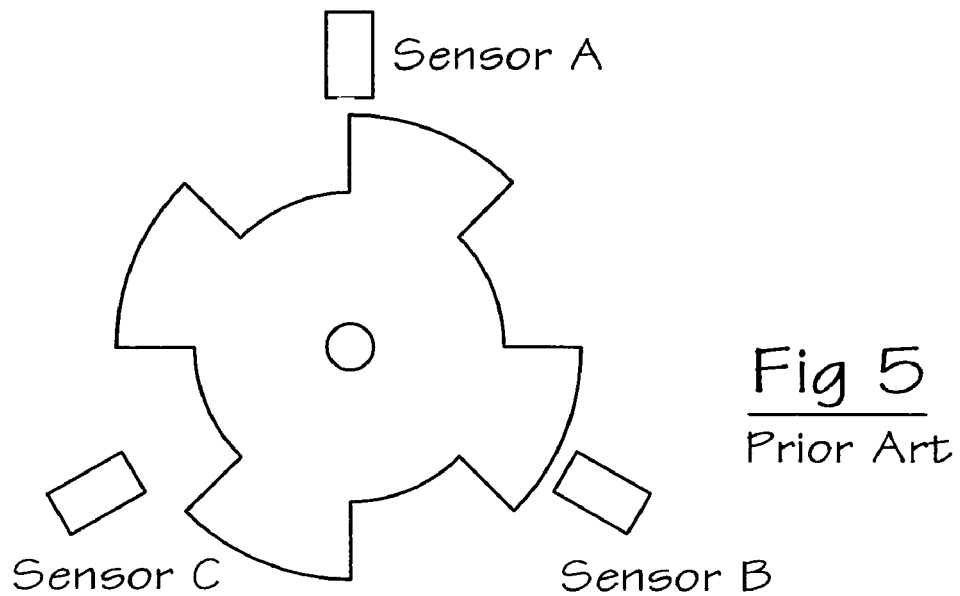
FIG. 5 shows a prior art rotor position transducer.
Figure 6:
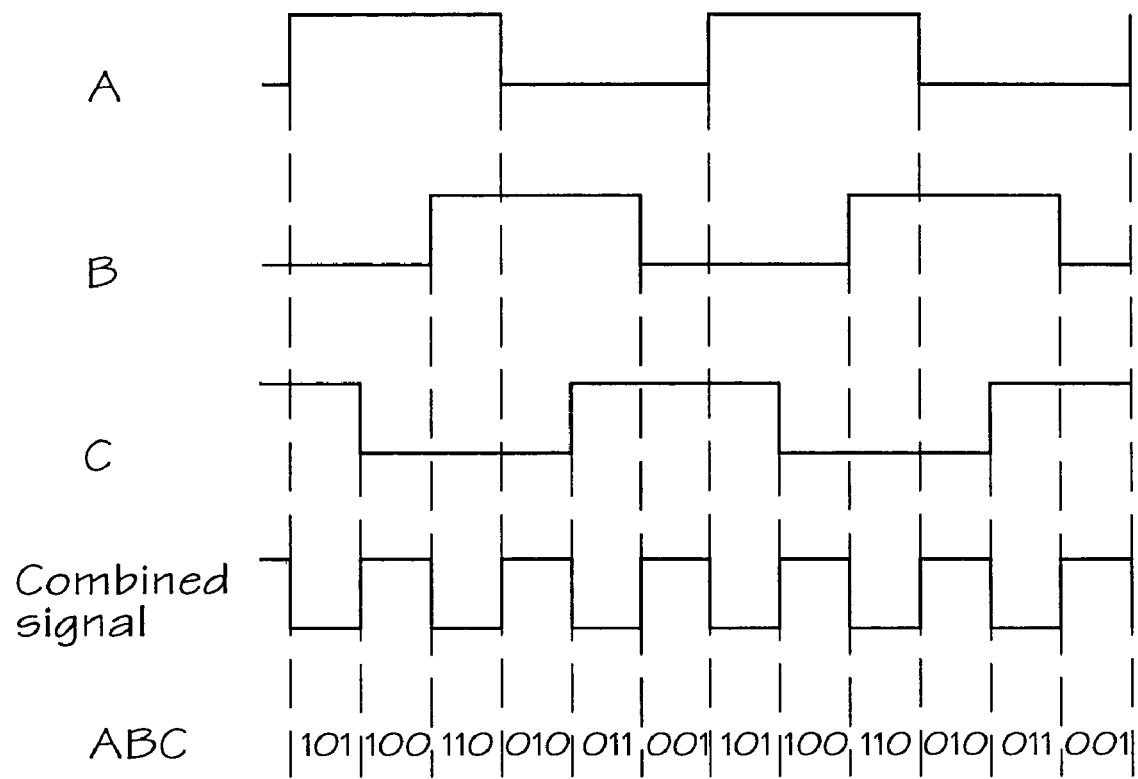
FIG. 6 shows the output signals from the transducer of FIG. 5.

A typical RPT for the 3-phase drive of FIG. 1 is shown schematically in FIG. 5. The three sensors are shown with 120° mechanical offset, but can have any offset which equals 120° electrical. The schematic shown has teeth with a mark:space ratio of unity. In practice, this may be varied slightly to accommodate any non-ideal characteristics of the sensors, e.g. beam width in an optical sensor or fringing in a Hall-effect sensor, so that the final signal from the RPT is at or acceptably near unity mark:space. The output from the RPT of FIG. 5 is shown in FIG. 6, where it will be seen that each RPT signal has a period equal to one electrical cycle of the machine. Typically, the vane and the sensors are aligned with respect to the stator such that the transitions in a phase signal correspond to the positions of minimum and maximum inductance of that phase. It is then possible, at low speeds, to base the commutation of the machine directly on these transitions, e.g. the phase can be energized when the RPT output is 1 and de-energized when it is 0, giving the A, AB, B, BC, . . . excitation pattern described earlier for a 3-phase machine.

Figure 7A:
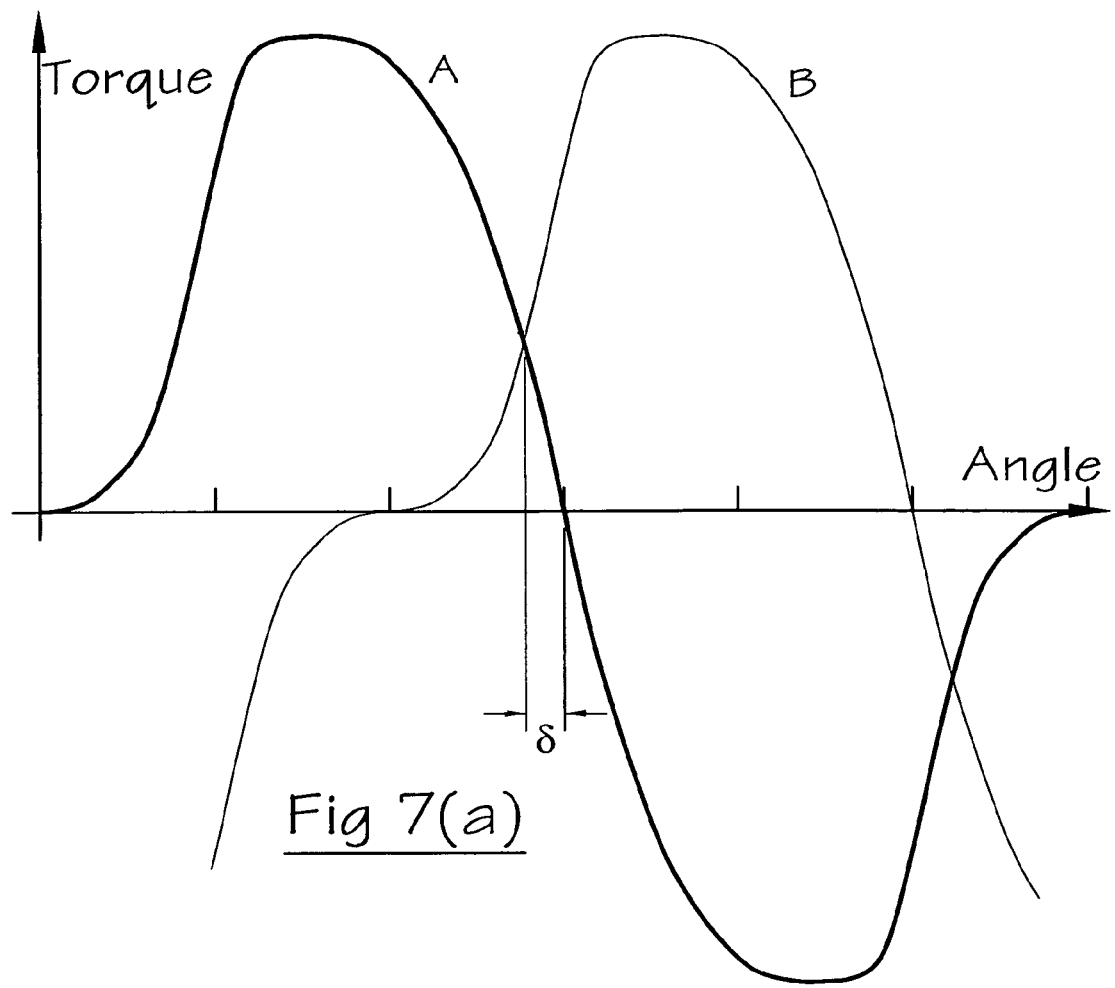
FIG. 7(a) shows torque curves for two phases of a 3-phase machine.
Figure 7B:
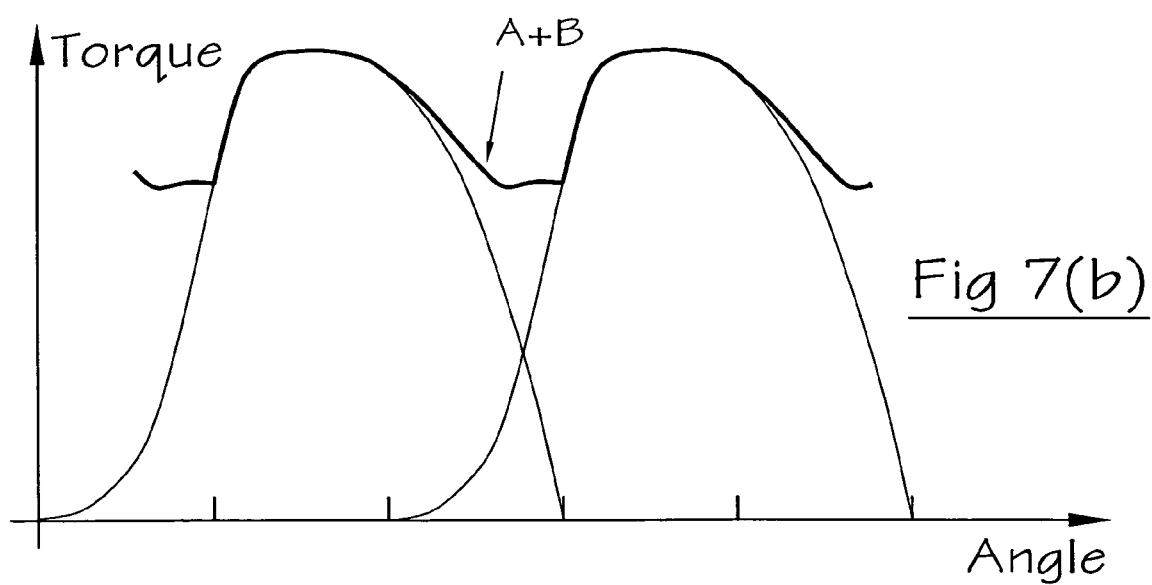
FIG. 7(b) shows a method of combining the torque curves of FIG. 7(a)

FIG. 7(a) shows the torque/angle curves for constant energization current in two phases of a three-phase system. The torque crosses the zero torque axis at the point of minimum inductance ($L_{min}$) and maximum inductance ($L_{max}$) for that phase. The reasons for this fact are discussed in the Stephenson paper cited above. By energizing the phases whenever they produce positive torque (i.e. 1½ phase conduction referred to above), the composite curve shown as A+B in FIG. 7(b) is obtained. While the exact shape is dependent on the details of the magnetic geometry of the machine and the level of current supplied, the curve shown is characteristic of the shape usually found. This excitation pattern produces the maximum torque for a given phase current, since it excites the phase over the complete half-cycle in which it produces torque of the desired polarity. In doing so, however, it energizes the phase at the parts of its torque curve where the developed torque is small. So, while it produces the maximum possible torque, the losses in the system are high, and the utilization of DC link current is relatively poor, having peaks when two phases are conducting. This disadvantage is particularly pronounced with 3-phase systems.

Figure 8A:
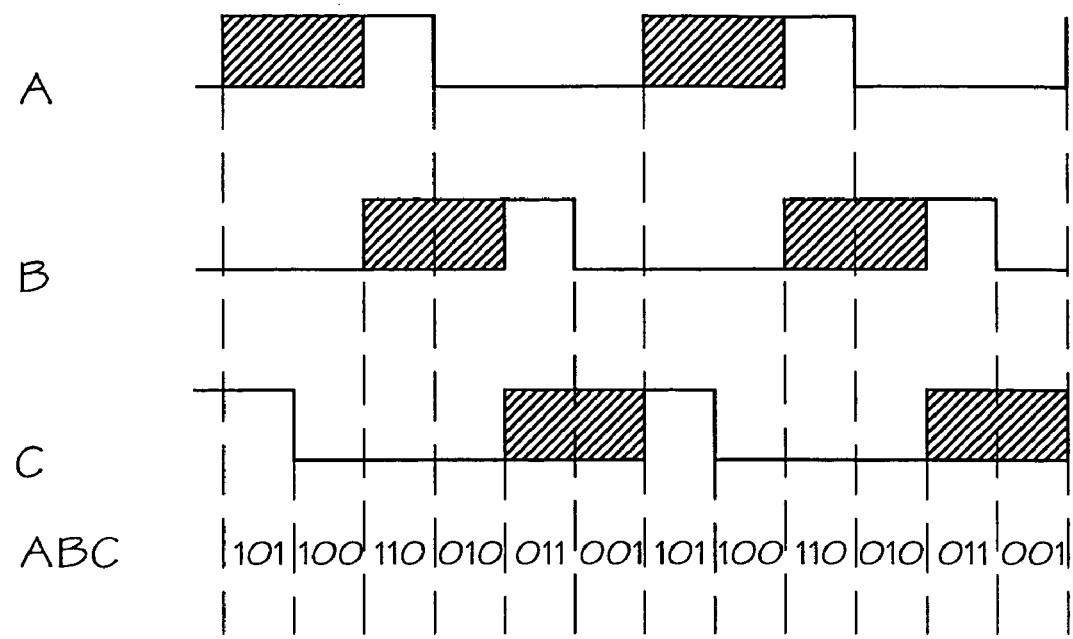
FIGS. 8(a) and (b) show a two excitation patterns for 3-phase machines.
Figure 8B:
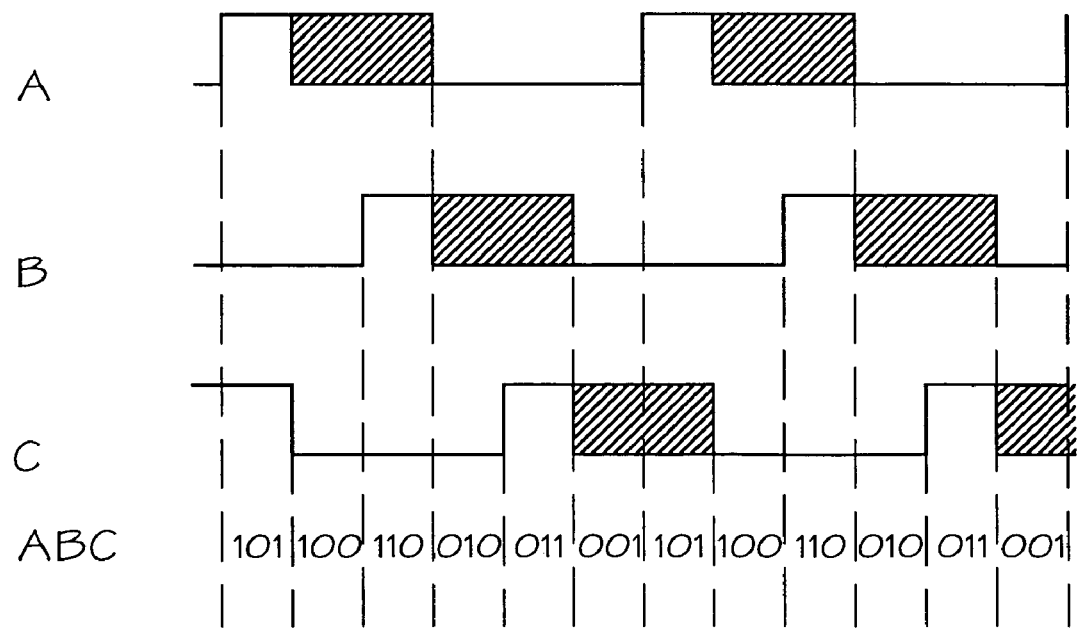
Figure 9A:
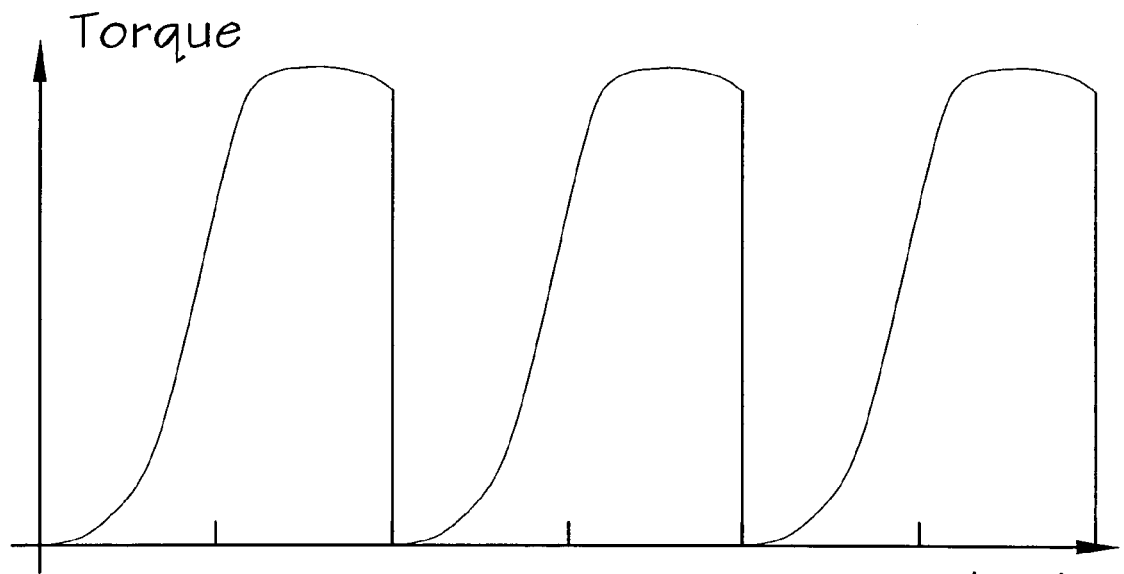
FIGS. 9(a) and (b) show torque/angle curves corresponding to FIGS. 8(a) and (b)
Figure 9B:
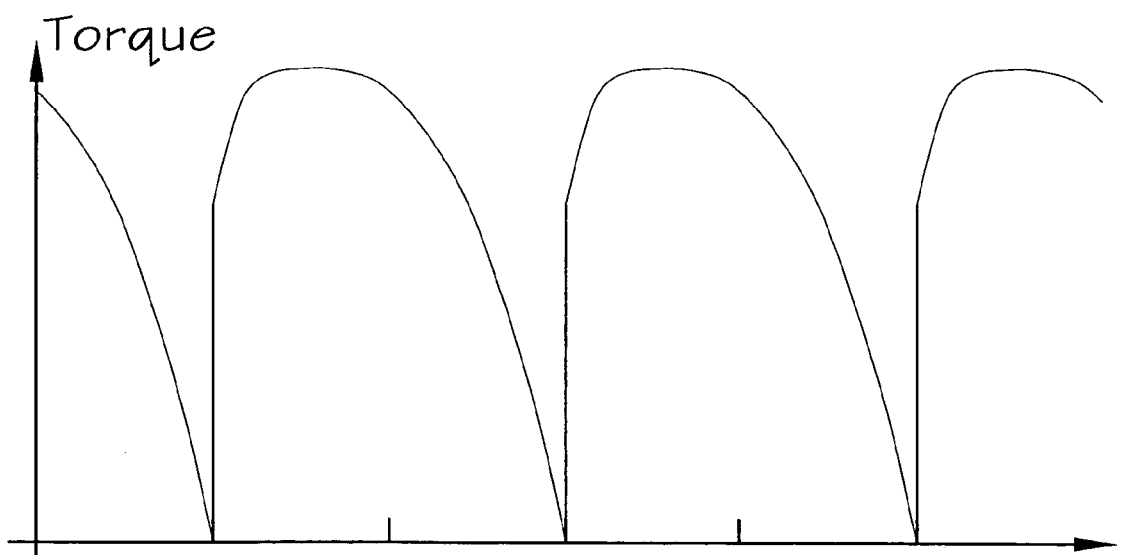

To avoid this problem, the strategy of using only one phase at a time is sometimes adopted. In applying this excitation strategy to a machine, it is apparent from FIG. 6 that, if standard RPT signals are to be used, a decision has to made whether to use the first ⅔ or the second ⅔ of the block, since transition points are only known at ⅓ and ⅔ of the block. These options are shown in FIGS. 8(a) and (b) respectively, where the hatched portions indicate current being supplied to the phases. These two options do not give the same effect since, in practical machines, the torque curves are not linear with angle over the region of partially overlapping poles, as are shown in FIGS. 9(a) and 9(b). FIG. 9(a) shows the composite torque curve produced by using the first ⅔ pattern, i.e. switching on at the minimum inductance position. There is a large dip evident around the transition points. Similarly, FIG. 9(b) shows the improvement of using the second ⅔ pattern, i.e. switching off at the maximum inductance position, which has a narrower dip. Nevertheless, both of these patterns produce a composite torque curve which falls to zero at three points in the cycle. This dip is inevitable with this excitation pattern and gives rise to a torque profile which is unacceptable in many applications.

It will be noted from FIG. 7(a) that a significant improvement can be made by moving the transition point by the angle δ to the point at which the adjacent phase curves cross. This represents the best that can be done with 33% conduction and yields the smallest dip. This movement of the transition point is achieved by moving the switching point of the RPT sensors by the angle δ and is a technique commonly used in switched reluctance machines, often called 'skewing' the RPT. However, it is seen by inspection of FIG. 7(a) that when torque is required in the reverse direction an angle of −δ is required, so either the RPT would require to be mechanically shifted for reversing (an impractical proposition); the RPT could be left in the +δ position (giving not just a torque dip but positive and negative torque for reversing);

or a second RPT could be provided, dedicated to reverse direction operation. While the last solution has been known to be adopted, it is expensive and introduces unwanted control complexity.

It is well known that the "step angle" of a machine is defined as $(360/qN_r)$, where q is the number of phases in the machine, and $N_r$ is the number of rotor poles. This step angle represents the pitch between the torque curves of the machine. Put another way: the step angle is the angular spacing between the torque curves for the phases of the machine. It can also be seen in FIG. 6 that the step angle is the angular difference between the sensor outputs A, B and C. FIG. 6 also shows the binary combination of the sensors ABC and a combined signal which is available from the RPT to indicate transition points in all three sensor waveforms. The period of the combined signal is 1/q of the period of the individual sensor waveforms. The RPT, therefore, is able to indicate rotor position to within half a step angle, but is ambiguous as to rotor position within the half step angle. The concept of step angle applies to a linear reluctance machine mutatis mutandis.

A first embodiment of the invention is used in the situation where the rotor is stationary (e.g. it may be that the drive is being called on to start from rest, or that an overload torque has stalled the rotor) and the signals from the RPT indicate that the position is one where two adjacent phases both provide torque in the desired direction. However, the ambiguity remains as to which phase is the contributor of torque most appropriate for starting from that position. For example in FIG. 6, an RPT output of 110 would indicate that either Phase A or Phase B would develop torque. The difficulty is that, because the RPT cannot give finer resolution of rotor position, it is indeterminate as to whether Phase A or Phase B will give sufficient torque to accelerate the rotor away from standstill. In addition, if Phase A is chosen (which is equivalent to using FIG. 9(b)), there is a likelihood that, even if the rotor moves initially, the reducing torque from that phase will fall below the load torque and the rotor will stall before reaching the transition point to Phase B.

These problems are overcome by programming the controller 14 to detect the RPT output (e.g. 110) and to nominate the candidate phases which might contribute best to starting torque (e.g. A and B for RPT output 110). The controller then energizes the two phases A and B alternately with a chosen time interval between the transitions. The interval is chosen to take account of the inertia of the system and thus is independent of RPT output—the higher the coupled inertia, the longer the interval. If the developed torque in the energized phase exceeds the load torque, the rotor will accelerate towards the next transition point of the RHPT. If the developed torque is less than the load torque, the rotor will not move and the interval will time out. The energization will then be applied to the other phase for the same time interval. If the first phase has failed to move the rotor, then the torque of the second phase will be greater and will accelerate the rotor in the desired direction past a point where the second phase alone will contribute to torque production.

This technique is also successful in the situation where the movement of the rotor is along a decreasing torque curve, since the rotor initially moves, then stalls. When the phase excitation is alternated, the incoming phase is now in a position to develop more torque and the rotor then moves off again.

Figure 10A:
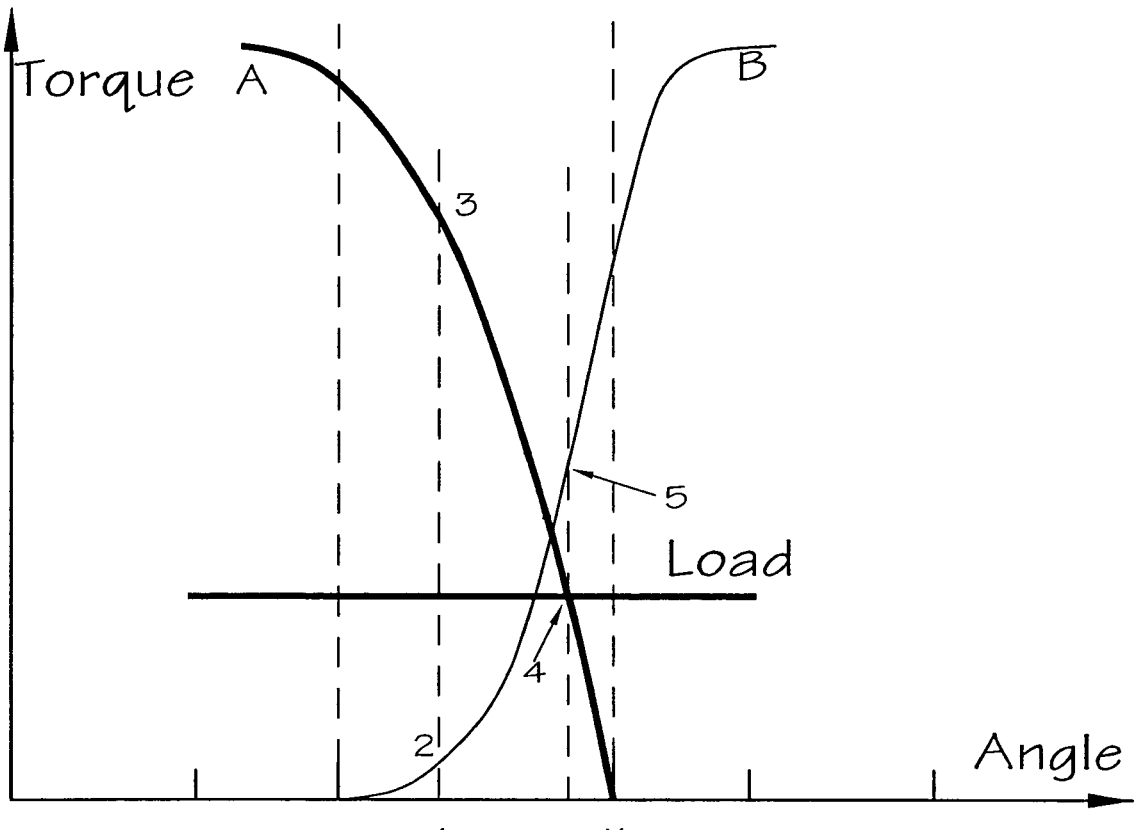
FIG. 10(a) shows torque/angle and load curves.
Figure 10B:
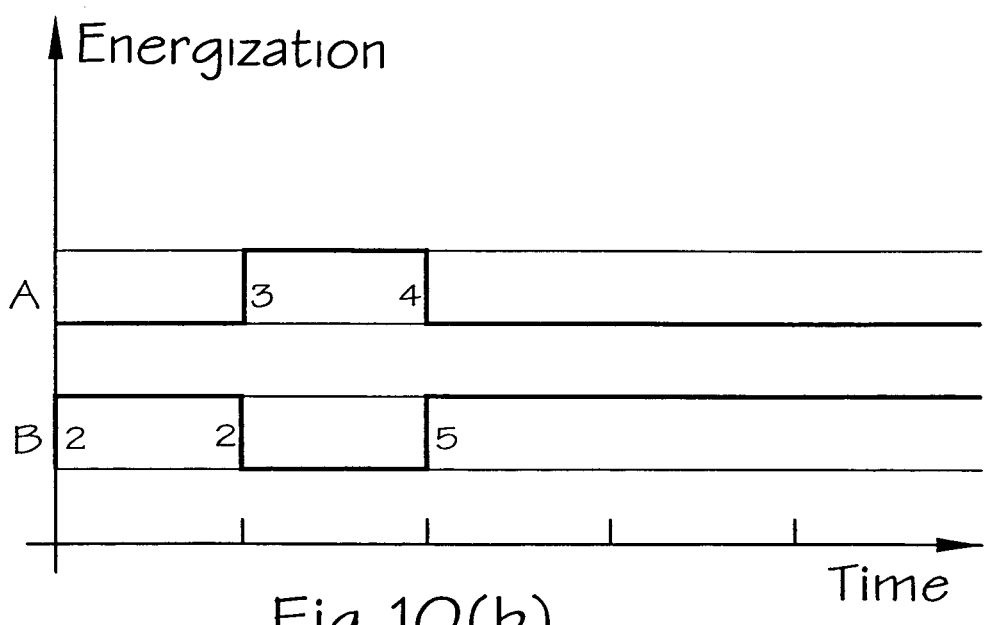
FIG. 10(b) shows an excitation pattern according to one aspect of the invention.

FIG. 10 illustrates this technique in more detail. The figure shows an expanded portion of FIG. 7(a) with an exemplary load torque superimposed. Consider FIG. 10(a) with the rotor at rest at position 1, between the transition points of the RPT marked x and y. If excitation is now applied to, say, Phase B as shown in FIG. 10(b), then torque will be developed corresponding to point 2 on the Phase B curve. Since this torque is far below the load torque, the rotor will not move, but the excitation remains applied to the phase for the chosen time interval. At the end of the time interval, the excitation is removed from phase B and applied to Phase A, where torque is developed corresponding to point 3 on FIG. 10(a). This torque is much greater than the load torque, so the rotor accelerates till it reaches position 4, i.e. the intersection between the load torque and the Phase A curve. The behavior at this point will depend on the characteristic of the load and the coupled inertia. If the inertia is zero, the rotor will stop there. With increasing inertia, the rotor will overshoot, heading down the Phase A curve towards point y. If the load has a component of restoring force, the rotor will tend to oscillate around point 4, but will eventually stop at that point. When the time interval has elapsed, the excitation is removed from A and re-applied to B, so that torque corresponding to point 5 is produced. This torque is now in excess of the load torque, so the rotor accelerates past position y and into the region where conventional excitation can be adopted.

From the above it can be seen that suitable coding can be added to the excitation algorithm to determine the sequence of energization for the two candidate phases for the chosen direction of rotation. By choosing to energize the phases in the order in which they are energized for running in the chosen direction, the number of alternatives of energization between candidate phases is minimized.

It will be realized that the time interval should be chosen to suit the load torque and inertia of the system, e.g. in one system an interval of 250 msec is selected.

By use of this embodiment of the invention, the maximum possible torque is applied to the load without knowledge of rotor position between RPT transitions, without skewing the RPT and without increasing the required supply current beyond that required by a single phase.

A further embodiment of the invention makes use of the capability of the power converter to freewheel the phase current, if that capability is present in the switching circuit chosen. In this embodiment, whenever excitation is removed from a phase, the phase current is allowed to freewheel. Even if this current does not last for the whole of the time interval that the supply current is applied to the other phase, it still produces torque in the correct direction without any contribution to the demand on the supply, so is beneficial.

It will be apparent to those skilled in the art that, having obtained initial rotation of the machine by use of the invention, any conventional excitation pattern can be adopted to continue rotation.

While the above description has been in terms of rotation in one direction, those skilled in the art will realize that bidirectional operation is available by using the appropriate sequence of excitation. Similarly, embodiments of the invention can be put into practice in both rotating and linear systems, and are not limited to any particular lamination geometry, pole number or phase number. The skilled person will appreciate that variation of the disclosed arrangements are possible without departing from the invention. Accordingly, the above description of several embodiments is made by way of example and not for the purposes of limitation. It will be clear to the skilled person that minor modifications can be made to the arrangements without significant changes to the operation described above.

What is claimed is:

1. A method of starting a switched reluctance motor having a stator with at least two phase windings, a moveable part, and a position transducer for providing information on the relative position of the moveable part with respect to the stator, the transducer having an output with a resolution which is no finer than half the step angle of the motor, the method comprising:
   determining from the transducer output a plurality of the phase windings that are available to produce force in a desired direction;
   energizing a first phase winding of the available phase windings for a predetermined time period; and
   energizing a second phase winding of the available phase windings for a further predetermined time period after energization of the first phase winding is initiated.

2. A method as claimed in claim 1 in which the second phase winding is energized after energization is removed from the first phase winding.

3. A method as claimed in claim 2 in which the first phase winding is re-energized after energization of the second phase winding is initiated and, thereafter, the phase windings are energized according to position information from the transducer.

4. A method as claimed in claim 1 in which the phase windings are energized according to information on the position of the moveable part from the transducer after energization of the second phase winding is initiated.

5. A method as claimed in claim 1 in which the first phase winding is freewheeled so that the current in the first phase winding is recirculated during at least part of the energization of a subsequent phase winding.

6. A method as claimed in claim 1 in which information from the position transducer is used to determine whether one or more than one of the phase windings is available to produce force in the desired direction, the first phase winding being energized for the predetermined period if more than one of the phase windings is available.

7. A method as claimed in claim 1 in which the position transducer output resolution is not fine enough to allow determination as to whether the first phase winding or the second phase winding will provide greater torque.

8. A method as claimed in claim 1 in which the lengths of the predetermined time period and the further predetermined time period are based on inertia associated with the moveable part.

9. A method as claimed in claim 1 in which the predetermined time periods are each independent of the transducer output.

10. A method of starting a switched reluctance motor having a stator with at least two phase windings, a moveable part, and a position transducer for providing information on the relative position of the moveable part with respect to the stator, the transducer having an output with a resolution which is no finer than half the step angle of the motor, the method comprising:
   determining from the transducer output a plurality of the phase windings that are available to produce force in a desired direction;
   energizing a first phase winding of the available phase windings for a predetermined time period, the predetermined time period being independent of the transducer output; and
   energizing a second phase winding of the available phase windings after energization of the first phase winding is initiated;
   wherein the second phase winding is energized after energization is removed from the first phase winding; and
   wherein the second phase winding is energized for a predetermined period, the first phase winding is re-energized after energization of the second phase winding is initiated and, thereafter, the phase windings are energized according to position information from the transducer.

11. A controller for starting a switched reluctance motor comprising a stator with at least two phase windings, a moveable part, and a position transducer providing information on the relative position of the moveable part with respect to the stator, the transducer having an output with a resolution which is no finer than half the step angle of the motor, the controller comprising:
   means for determining from the transducer output a plurality of the phase windings that are available to produce a force in a desired direction;
   means for energizing a first of the available phase windings for a predetermined time period; and
   means for energizing a second of the available phase windings for a further predetermined time period after energization of the first phase winding is initiated.

12. A controller as claimed in claim 11 in which the means for energizing the second phase winding is operable to energize the second phase winding after energization is removed from the first phase winding.

13. A controller as claimed in claim 12, including means for re-energizing the first phase winding after energization of the second phase winding is initiated, and means for energizing the phase windings thereafter according to rotor position information from the transducer.

14. A controller as claimed in claim 11, including means for energizing the phase windings according to position information from the transducer after energization of the second phase winding is initiated.

15. A controller as claimed claim 11, including means for freewheeling the first phase winding so that current in the first phase winding is recirculated during energization of the second phase winding.

16. A controller as claimed in claim 11, including means for determining whether one or more than one of the phase windings is available to produce force in the desired direction, the first phase winding being energized for the predetermined period if more than one phase winding is available.

17. A controller as claimed in any of claim 11 in which the position transducer output resolution is not fine enough to allow determination as to whether the first phase winding or the second phase winding will provide greater torque.

18. A controller as claimed in claim 11 in which the lengths of the predetermined time period and the further predetermined time period are based on inertia associated with the moveable part.

19. A controller as claimed in claim 11 in which the predetermined time periods are each independent of the transducer output.

20. A controller for starting a switched reluctance motor comprising a stator with at least two phase windings, a moveable part, and a position transducer providing information on the relative position of the moveable part with respect to the phase windings, the transducer having an output with a resolution which is no finer than half the step angle of the motor, the controller comprising:
   means for determining from the transducer output a plurality of the phase windings that are available to produce a force in a desired direction;

means for energizing a first of the available phase windings for a predetermined time period, the predetermined time period being independent of the transducer output; and means for energizing a second of the available phase windings after energization of the first phase winding is initiated;

wherein the means for energizing the second phase winding is operable to energize the second phase winding after energization is removed from the first phase winding; and including means for energizing the second phase winding for a predetermined period, means for re-energizing the first phase winding after energization of the second phase winding is initiated, and means for energizing the phase windings thereafter according to rotor position information from the transducer.

21. A method of starting a switched reluctance motor having a stator with at least two phase windings, a moveable part, and a position transducer for providing information on the relative position of the moveable part with respect to the stator, the transducer having an output with a resolution which is no finer than half the step angle of the motor, the method comprising:

determining from the transducer output a plurality of the phase windings that are available to produce force in a desired direction;

energizing a first phase winding of the available phase windings for a predetermined time period, the predetermined time period being independent of the transducer output; and energizing a second phase winding of the available phase windings after energization of the first phase winding is initiated;

wherein the length of the predetermined time period is based on inertia associated with the moveable part.

22. A controller for starting a switched reluctance motor comprising a stator with at least two phase windings, a moveable part, and a position transducer providing information on the relative position of the moveable part with respect to the stator, the transducer having an output with a resolution which is no finer than half the step angle of the motor, the controller comprising:

means for determining from the transducer output a plurality of the phase windings that are available to produce a force in a desired direction;

means for energizing a first of the available phase windings for a predetermined time period, the predetermined time period being independent of the transducer output; and means for energizing a second of the available phase windings after energization of the first phase winding is initiated;

wherein the length of the predetermined time period is based on inertia associated with the moveable part.

* * * * *